US008410793B2

(12) United States Patent
Armbruster et al.

(10) Patent No.: US 8,410,793 B2
(45) Date of Patent: Apr. 2, 2013

(54) APPARATUS FOR ASCERTAINING AND/OR MONITORING AT LEAST ONE FILL LEVEL OF AT LEAST ONE MEDIUM IN A CONTAINER ACCORDING TO A TRAVEL-TIME MEASURING METHOD AND/OR A CAPACITIVE MEASURING METHOD

(75) Inventors: Ralf Armbruster, Schallstadt (DE); Roland Grozinger, Staufen (DE); Bernhard Michalski, Maulburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 340 days.

(21) Appl. No.: 12/735,119

(22) PCT Filed: Dec. 12, 2008

(86) PCT No.: PCT/EP2008/067371
§ 371 (c)(1),
(2), (4) Date: Jun. 17, 2010

(87) PCT Pub. No.: WO2009/077435
PCT Pub. Date: Jun. 25, 2009

(65) Prior Publication Data
US 2010/0301878 A1  Dec. 2, 2010

(30) Foreign Application Priority Data
Dec. 18, 2007  (DE) .......................... 10 2007 061 573

(51) Int. Cl.
*G01R 27/32* (2006.01)
*G01R 27/00* (2006.01)

(52) U.S. Cl. ........................................ 324/642; 324/600
(58) Field of Classification Search .................. 324/676
See application file for complete search history.

(56) References Cited

U.S. PATENT DOCUMENTS

| 3,037,114 | A | * | 5/1962 | Bier et al. ................. 455/277.1 |
| 4,786,857 | A | * | 11/1988 | Mohr et al. ................. 73/304 R |
| 5,838,241 | A | * | 11/1998 | Lease et al. ................. 340/618 |
| 5,917,334 | A | * | 6/1999 | Grunewald et al. ...... 324/765.01 |

FOREIGN PATENT DOCUMENTS

| DE | 34 32 987 C2 | 4/1985 |
| DE | 43 45 242 A1 | 4/1995 |
| DE | 199 31 386 C2 | 2/2001 |
| DE | 100 37 715 A1 | 2/2002 |
| EP | 1 306 105 A1 | 5/2003 |
| WO | WO 95/16190 | 6/1995 |

* cited by examiner

*Primary Examiner* — Vinh Nguyen
(74) *Attorney, Agent, or Firm* — Bacon & Thomas, PLLC

(57) ABSTRACT

An apparatus for ascertaining and/or monitoring at least one fill-level of at least one medium in a container according to a travel-time measuring method and/or a capacitive measuring method by means of at least one measuring probe. A capacitive measurement circuit, which produces a low frequency measurement signal on the measuring probe, a time-domain reflectometer measurement circuit, which produces a high frequency, electromagnetic signal sent out as a sent signal and a control/evaluation unit, which controls both measurement circuits are included. Also included is a diplexer, which sends the low-frequency measurement signal and the high-frequency, electromagnetic measurement signal to the measuring probe and effects a signal separation of the high-frequency, electromagnetic measurement signal into the first signal path of the time-domain reflectometer measurement circuit and the low-frequency measurement signal into the second signal path of the capacitive measurement circuit.

6 Claims, 2 Drawing Sheets

APPARATUS FOR ASCERTAINING AND/OR MONITORING AT LEAST ONE FILL LEVEL OF AT LEAST ONE MEDIUM IN A CONTAINER ACCORDING TO A TRAVEL-TIME MEASURING METHOD AND/OR A CAPACITIVE MEASURING METHOD

TECHNICAL FIELD

The invention relates to an apparatus for ascertaining and/or monitoring at least one fill-level of at least one medium in a container according to a travel-time measuring method and/or a capacitive measuring method by means of at least one measuring probe.

The apparatus includes a capacitive measurement circuit, which produces a low-frequency measurement signal on the measuring probe and thereby ascertains the capacitance or a reactance; a time domain reflectometer-measurement circuit, which produces a high-frequency, electromagnetic measurement signal sent out as a sent signal via the measuring probe, which receives a reflection signal as an echo, and which through a time difference between the sending of the sent signal and the reception of the reflection signal ascertains a travel time or even a travel-time dependant echo curve; and a control/evaluation unit which drives both measurement circuits and ascertains the fill-level from the ascertained capacitance, the ascertained reactance, the ascertained travel-time or the ascertained travel-time-dependant echo curve.

BACKGROUND DISCUSSION

Such apparatuses are found, for example, in measurement devices and field devices in process measurements technology. These measurement devices are frequently employed in automation, and process control, technology for the ascertainment of a process variable, e.g. boundary surface, fill level, dielectric constant or some other type of physical and/or chemical process variable in a process flow. The assignee, for example, produces and sells measuring devices under the marks Levelflex and Multicap, which are primarily intended for determining and/or monitoring the fill-level of a medium in a container. In one of the large number of travel-time measuring methods, for example according to the guided microwave method, time domain reflectometry, or the TDR-measuring method (Time Domain Reflection), a high frequency pulse is sent along a Sommerfeld or Goubau waveguide or a coaxial waveguide and partially reflected back in the event of a DK-value (dielectric constant) discontinuity in the medium surrounding the waveguide. The fill-level can be ascertained from the time difference between the sending of the high-frequency pulse and the receipt of the reflected echo signal of the medium. The FMCW-method (Frequency Modulated Continuous Waves), in which the frequency range of a continuous measurement signal changes and the distance is measured via the frequency difference between the sent and the reflected measurement signals, is likewise performable in connection with the above measuring principle.

An additional measuring principle of the many different methods for ascertaining the fill-level in a container is the investigation of the capacitance change of a capacitive measurement setup with a medium-contacting measuring probe and the corresponding container wall or reference probe, if the degree of covering of the measuring probe with the medium, i.e. the fill-level of the medium in the container, changes.

Both of the techniques described above are so-called medium-contacting fill-level-measuring techniques, in which a measuring probe comes in direct contact with the medium to be measured. The measuring probe is normally secured in a container via a process connection, opening or nozzle, so that the measuring electronics are located outside of the process (i.e. not in contact with the medium), and the measuring probe is integrated in the process. Examples of these two procedures are described in more detail in the following references.

In European Patent, EP 1 069 649 A1, a simple construction of the waveguide for a fill level measuring device is shown, which unites the advantage of the one-wire and known multi-wire waveguides in that it exhibits no interaction with objects installed in the container, and can easily be cleaned of accumulated deposits. This was achieved in that the multi-wire waveguide is at least partially surrounded by a dielectric medium during the process, and thus no accretion can form between the individual wave guides.

In German Patent, DE 10157762 A1, a procedure is described for the capacitive fill-level measurement of a fill substance in a container with a measuring electrode and an evaluating circuit, in which the capacitive reactance is ascertained by means of two alternating voltage signals with different frequencies, thus eliminating the ohmic resistance.

In all known physical measuring principles, a compromise must, most often, be made with regard to the accuracy of the measurement and the reliability of the measurement. Therefore, on the basis of the environmental conditions and the properties of the medium, the most expedient physical measurement principle is selected, whose advantages outweigh its disadvantages. Fundamentally, there are employed in process-measurements technology as freely radiating measuring methods various physical measurement principles, such as microwave-travel-time measurement, ultrasound-travel-time measurement and gamma-ray-absorption measurement, as well as occasionally laser-light-travel-time measurement. As concerns medium-contacting procedures, the plumb-measuring method, the capacitive measuring method, the conductive measuring method and the guided-microwave measuring method, among others, are known. All of these measurement techniques have advantages over other measuring techniques according to the measuring principle, the measured medium, the measuring situation, the conditions of the process and the measurement performance.

A direct comparison of the various physical measuring principles shows that the selection of the measuring principle best-suited for the current application is in most cases very difficult. However, in the case of interface measurement, a large number of applications are covered by the highly developed medium-contacting measuring devices or combinations of these devices.

A fill-level measuring device in which both medium-contacting measuring techniques are employed is described the patent application DE 100 37 715 A1. In this publication, a fill-level measuring device is described whose medium-contacting measuring probe is connected with the capacitive measurement circuit or the travel-time measuring circuit via a change-over switch. The disadvantages of this design are that this change-over switch includes a semiconductor component which is located relatively near the measuring probe or the sensor in the signal path, and thus must be elaborately protected against electrostatic discharges. Moreover, an additional control line and a control signal for the switching of the change-over switch are required.

SUMMARY OF THE INVENTION

It is an object of the invention to provide a medium-contacting fill-level measuring device that exhibits an optimized accuracy of measurement and an optimized reliability and which avoids the above disadvantages.

This object is achieved according to the invention by the features that a diplexer is provided which directs the low frequency measurement signal and the high-frequency, electromagnetic measurement signal to the measuring probe, and which causes a signal separation of the high-frequency, electromagnetic measurement signal in the first signal path of the measurement circuit of the time-domain reflectometer, and of the low-frequency measurement signal in the second signal path of the capacitive measurement circuit.

An advantageous embodiment of the solution according to the invention can be seen in fact that the diplexer includes at least one highpass filter matched to the high-frequency, electromagnetic measurement signal and one lowpass filter matched to the low-frequency measurement signal.

An additional advantageous embodiment of the solution according to the invention is therein to be seen that the highpass filter is made up of at least a first capacitor and a first coil.

In a particularly preferred embodiment of the invention, it is provided that the lowpass filter is made up of at least a second coil.

In an advantageous embodiment of the apparatus according to the invention, it is provided for that measurement occurs alternately according to a travel-time method and/or a capacitive measuring method, and that the capacitive measurement circuit and the time-domain reflectometer measurement circuit are alternately driven and evaluated by the control/evaluation unit.

An advantageous embodiment of the apparatus according to the invention is therein to be seen that the measurement occurs simultaneously according to a travel-time method and/or a capacitive measuring method, and that the capacitive measurement circuit and the time-domain reflectometer measurement circuit are simultaneously driven and evaluated by the control/evaluation unit.

Subject matter of the present invention is a concept for a multisensor comprising a capacitive fill-level sensor and a microwave fill-level sensor, providing for an improvement of the reliability and accuracy of the fill-level/distance measurement in the fill-level measurement device. To guarantee an increased accuracy and reliability in the measurement of the fill-level, redundant measuring devices are used in process measurements technology for plausibility weighing and measurement calibration. In such case, the goal aspired to in a diverse redundance weighing of the measuring is to realize the redundant measuring devices as differently as possible. For example, in order to determine the contents of a large oil tank, a pressure sensor may be placed in the bottom of the tank which determines the fill-level by means of hydrostatic fill-level measurement, and a radar device may be placed in the tank lid, which ascertains the fill-level by means of the travel-time method. Through the use of different physical properties and different designs, the probability that a systematic error simultaneously affects all of the various measuring devices becomes extremely low. In such case, the diverse redundancy of capacitive measurement signals and microwave measurement signals is used to the effect that, on one hand, the essential disturbing influences in the propagation path affect the electromagnetic measuring method or the capacitive measuring method in different ways, and, on the other hand, that the measurement signals deliver redundant measurement results despite the differing operating principles. The measurement signals can thus be compared at the measurement signal level without elaborate (and as a rule lossy) feature transformations, and above all the weaknesses of the individual sensors are overcome.

With their simple construction and low price, capacitive fill-level measuring devices have long been established in process measurements technology. Due to progress in the development of microwave components and structural-design technology, time-domain reflectometers are also increasingly economical to produce. Disadvantageous in capacitive measuring devices, however, is that they are subject to many influences; gradients in the dielectric constant of the medium, temperature gradients, flows or other material changes in medium make themselves noticeable in amplitude and phase fluctuations of the capacitive measurement signal. In contrast to this, time-domain reflectometers are only very slightly influenced by changes in the medium and the propagation attenuation is extremely small.

High reliability of the measurement results, or of the sensor output, at smaller cross-sensitivity and higher disturbance resistance in the face of environmental influences and noise stand at the forefront of the development of every sensor. For the plausibility checking of measurement results and to decrease failure rates, redundant multi-sensor systems which unite several individual sensors of the same type in a parallel structure are frequently constructed. With the evaluation of the received signals from individual sensors of differing types with output signals from complementary events, an expansion of the response behavior of the total sensor is sought. These so-called diverse multi-sensors have become increasingly attractive in recent years and are employed for various tasks, as German Patent, DE 100 37 715 A1 demonstrates. German Patent, DE 100 37 715 A1 shows a combination of two measurement procedures for the plausibility weighing of the measurements, in which the fill-level is alternately or simultaneously ascertained according to a travel-time method using a microwave measurement signal or according to a capacitance measurement by means of a medium-contacting measurement probe. The higher dimensionality of the observation space results in measurement results which cannot be achieved through simple multi-element arrangements of identical sensor elements. Diverse multi-sensors which are based on the direct comparability of the wanted signals while disturbance signals are not statistically correlated possess a particular importance for widening the possibilities of sensor technology. Through the evaluation of this so-called diverse redundancy, the fusion result exhibits a significantly increased robustness vis-à-vis the disturbing influences of the individual sensors; the trustworthiness of the sensor output is increased. This claim is fulfilled in suitable manner by sensor systems that, for medium-contacting fill-level measurement, simultaneously make use of a capacitive measuring technique and travel-time measurement technique using microwaves, and evaluate the redundancy of the received signals from an overlapping spatial registration area of a measuring probe.

A further advantage of the combination of both measurement techniques is that in the case of different, immiscible media in the container, a determining of the interface can occur via the two different measuring techniques. Additionally, in the case of organic solvents, a large portion of the microwave radiation is by no means entirely reflected off the surface of the fill substance, but rather penetrates into the fill substance and is reflected off the bottom of the tank or reflected off an interface with the lower medium. Through the additional reflections of the measurement signal off the interface of the different, immiscible media in the container and off the end of the measuring probe, the fill-levels of the individual media in the container can be determined. In the event of a low fill-level in the container, a small fill-level echo can then not be detected, because of an echo-superimposition from a large echo from the bottom of the tank. Capacitive fill-level measurement does not have this problem, provided the dielectric constants of the media in the container are known. A measurement value for the fill-level can in these cases be ascertained through a skilled combining of the two measurement techniques. In those cases in which capacitive measurement and time-domain reflectometer measurement deliver unique, parallel results from a single, shared measuring probe, the capacitive measurement can be calibrated with the results of the time-domain reflectometer measurement.

BRIEF DESCRIPTION OF THE DRAWINGS

Additional details, features and advantages of the subject matter of the invention will become evident from the following description and the associated drawing, in which preferred examples of embodiments of the invention are presented. In the examples of embodiments of the invention presented in the figures, to provide a better overview and to simplify, those elements with corresponding constructions or functions are given the same reference characters. The figures of the drawing show as follows.

DETAILED DISCUSSION IN CONJUNCTION WITH THE DRAWINGS

Figure 1:
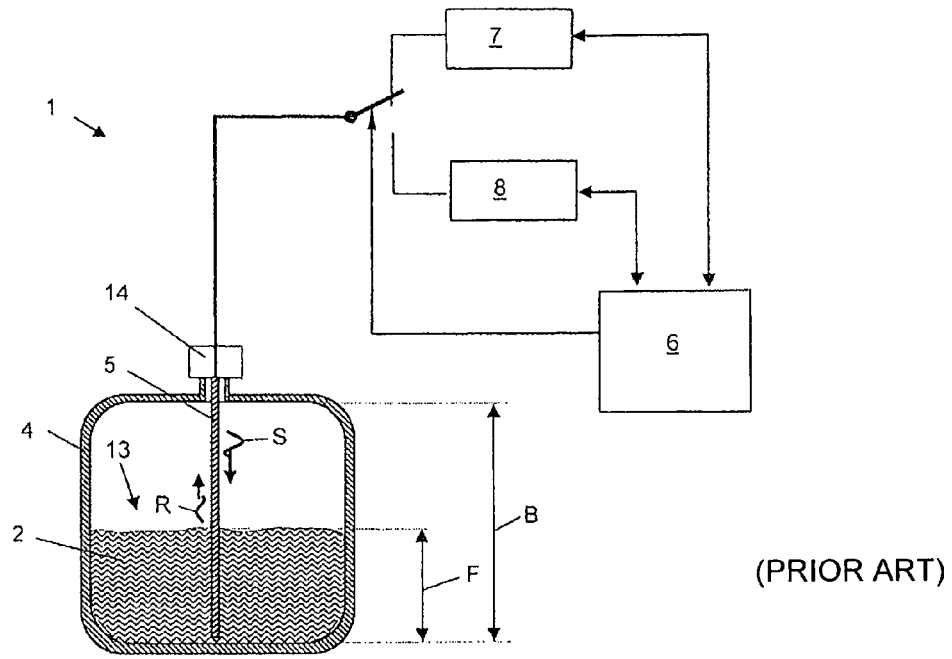
FIG. 1 is a schematic representation of a multi-sensor unit according to the state of the art.

In the German Patent, DE 100 37 715 A1, a multi-sensor for determining the fill-level F is shown, which is constructed of a capacitive fill-level measuring device and a time-domain reflectometer. Such is presented in FIG. 1. This multisensor constructed of a time-domain reflectometer and a capacitive measuring device is used for determining with a rod or cable-shaped measuring probe 5 the fill-level F of a medium 2 in a container 4. The measuring probe 5 is connected with the high-frequency measurement signal MHF from the time-domain reflectometer measurement circuit 7 and/or the low-frequency measurement signal MLF from the capacitive measurement circuit 8 via a change-over switch.

As previously described, the disadvantage of this embodiment is that the change-over switch includes a semiconductor component, e.g. a MOSFET-transistor, which is located relatively close to the measuring probe 5 or the sensor in the signal path. Due to this design, it is necessary that this change-over switch be elaborately protected against electrostatic discharges on the measuring probe 5. Moreover, an additional control line and a control signal for the operation of the switch are required, whereby an increased circuit complexity is necessary for this additional control line.

Figure 2:
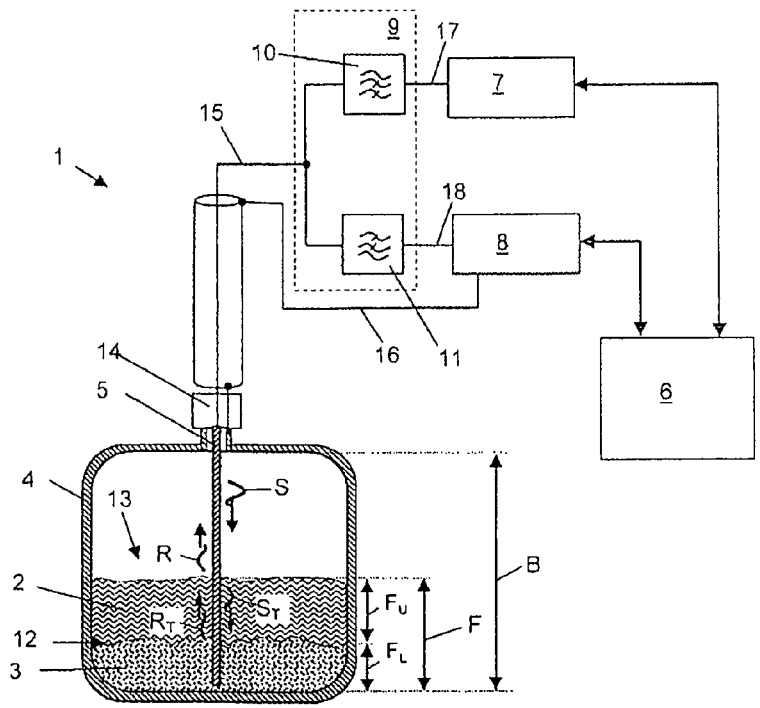
FIG. 2 is a schematic representation of an example of an embodiment of a multisensor unit with a diplexer as an apparatus of the invention for measurement signal separation.

An opportunity for avoiding these disadvantages is shown in FIG. 2 as an embodiment of the invention for an apparatus 1 for determining the fill-level F in a container. The apparatus 1 is composed of a multi-sensor having a time-domain reflectometer and a capacitive fill-level measuring device. A diplexer 9 is provided for the separation of the electromagnetic travel-time measurement's high-frequency measurement signal $M_{HF}$ from the capacitive measurement's low-frequency measurement signal $M_{LF}$.

In the case of the guided microwave method, the time-domain reflectometry or TDR measuring method (Time Domain Reflection), a high-frequency signal $M_{HF}$ is produced and transmitted as a sent signal S (e.g. a 1.5 GHz microwave signal) along the measuring probe 5 (for example a Sommerfeld or Goubau surface waveguide, or a coaxial waveguide), which is reflected back in the event of a DK-value (dielectric constant) discontinuity in the medium 2,3 surrounding the measuring probe 5. As a result of the impedance jumps (caused by the media 2,3) within the process space of the container 4, especially at the boundary surfaces, e.g. the upper surface 13 or the interface 12 of the media 2,3 in the container 4; the sent signal S and/or the transmission signal $S_T$ are at least partially reflected back. Due to this, a corresponding, normally weaker reflection signal R and/or an interface reflection signal $R_T$ travels back in the opposite direction on the measuring probe 5 and via the measurement line 15 to the transmitting/receiving unit of the time-domain reflectometer measurement circuit 7. From the travel-time difference between the sent signal S, $S_T$ and the reflection signal R, RT, the corresponding fill-levels F, $F_{U(pper)}$, $F_{L(ower)}$ are ascertained in the time-domain reflectometer measurement circuit 7 and transmitted to the control/evaluation unit 6 as measurement values. The control/evaluation unit 6 is, for example, embodied as a microcontroller 6, which in addition to the evaluation of the measurement values of the fill-level F, $F_U$, $F_L$, performs other control and communication functions in the measuring device. The measuring probe 5 is attached to the container 4 via a coupling element 14, and connected with the diplexer 9 the via a measurement line, e.g. a coaxial cable.

The formation of an interface 12 occurs with at least two different media 2,3 in a container 4, which, like oil and water, do not mix together. In order to be able to separately register the amount or volume of both media 2,3, it is necessary to register the upper portion $F_U$ of the fill-level for the upper medium 2, the lower portion $F_L$ of the fill-level for the lower medium 3 or the interface T between the two media 2,3. In the case of the interface measurement, in addition to the reflection signal R from the surface 13 of the first medium 2, an additional interface reflection signal $R_T$ can be ascertained from the interface 12 between the first medium 2 and the second medium 3. It is possible by means of this interface reflection signal $R_T$ to determine the upper portion $F_U$ of the fill-level for the first medium 2 and/or the lower portion $F_L$ of the fill-level for the second medium 3. In order for it to be possible for this interface reflection signal $R_T$ to be ascertained, it is necessary that not all of the energy of the sent signal S be completely reflected off the surface 13 of the first medium 2, but rather that a portion of the sent signal S be transmitted as transmission signal $S_T$ into the first medium 2. The transmission and reflection of the sent signal S and the interface's transmission signal $S_T$ are primarily dependant on the dielectric constants of the measured media 2,3.

For this embodiment of the apparatus 1, also a capacitive measuring system with a capacitive measurement circuit 8 is employed for determining the fill-level F of media 2,3 in a container 4, wherein the capacitance between the measuring probe 5 and a reference electrode or the wall of the container 4, ascertained via a low-frequency measurement signal MLF, is dependent on the fill-level F and the dielectric constants of the media 2,3. With the capacitive measuring technique, both a continual measuring of the fill-level F as well as a signaling of a predetermined fill level F being reached is possible, wherein the latter case involves a limit level switch. The measuring probe 5 and the wall of the container 4 form a measurement capacitor CM, whose dielectric is the media 2, 3 in the container 4. The capacitance of this measuring capacitor CM is in such an event among other things dependent on the fill-level F of the media 2,3, so that the the fill-level F can be inferred from the changing capacitance. If the degree of covering of the measuring probe 5 with the media 2,3, or the fill level F, changes in the container 4, a nearly proportional change in the capacitance of the measuring capacitor CM is detected by the measurement setup. An approximately analogous measuring principle is based upon a conductive measuring technique in which the change in conductivity can be ascertained as a function of the fill-level of a conductive medium in a container. The various examples of embodiments for measuring the capacitance can for example be drawn from the Offenlegungsschriften (German laid open application) DE 101 57 762 A1 or DE 101 61 069 A1 of the assignee. For measuring the capacitance value, the measuring probe 5 is typically supplied via the measurement line 15 with a low-frequency measurement signal SLF, which for example involves an electrical alternating voltage in the 20 kHz-region. Via the measurement line 14 (connected with the wall of the container 4) and the measuring line 15 (connected via the diplexer 9 with the measuring probe 5), the capacitive measurement circuit 8 ascertains the capacitance of the measuring capacitor CM. Since, on the basis of experience, this involves extremely small electrical capacitance or capacitance changes on the part of the measuring capacitor CM, three different procedures are generally used:

- charge amplifiers measure at applied direct voltage the shifting of electrons accompanying capacitive changes of the measuring capacitor CM and thus can exclusively register fast or brief changes;
- amplitude modulated systems supply the measurement capacitor CM with high frequency, alternating electrical current and register the resulting reactive electrical current; and
- frequency modulated systems connect the measurement capacitor CM together with an inductance to form an oscillatory circuit, whose resonance frequency can be measured.

Since, in contrast to the capacitive measuring technique, far higher frequencies are worked with in the time-domain reflectometer measurement technique, a separation of the low-frequency measurement signal $M_{LF}$ from the high-frequency measurement signal $M_{HF}$ can be achieved via a frequency selective circuit, or diplexer 9.

The diplexer 9 according to the invention is made of a highpass filter 10 for the first signal path 17 of the time-domain reflectometer measurement circuit 7 and a lowpass filter 11 for the second signal path 18 of the capacitive measurement circuit 8. Since the filter components of the diplexer 9, respectively, the highpass filter 10 and lowpass filter 11, involve only passive components such as coils $L_1$, $L_2$ and a capacitor C, these do not need to be specially protected against electrostatic discharges (ESD). As an additional advantage, in the case of the embodiment of the apparatus 1 according to the invention using a diplexer (in contrast to the embodiment with a changeover switch), no additional control signal is necessary for switching over or separating the low-frequency measurement signal $S_{LF}$ or the high-frequency measurement filter $S_{HF}$, and a simultaneous measuring by means of both measurement techniques is possible.

In order to prevent a mutual influencing of the two measuring techniques, the following boundary conditions are to be kept in mind in the design of the highpass filter 10 and the lowpass filter 11:

- the highpass filter 10 in the first signal path 17 of the time-domain reflectometer measurement circuit 7 should be transmissive for the high-frequency measurement signal $S_{HF}$;
- the lowpass filter 11 in the second signal path 18 of the capacitive measurement circuit 8 must not additionally attenuate the high-frequency measurement circuit $S_{HF}$;
- the lowpass filter 11 in the second signal path 18 of the capacitive measurement circuit should be transmissive for the low-frequency measurement signal $S_{LF}$; and
- the capacitance of the capacitor C of the high-pass 10 should at least with regard to temperature stay as constant as possible and be designed as a not-too-great capacitance value.

Figure 3:
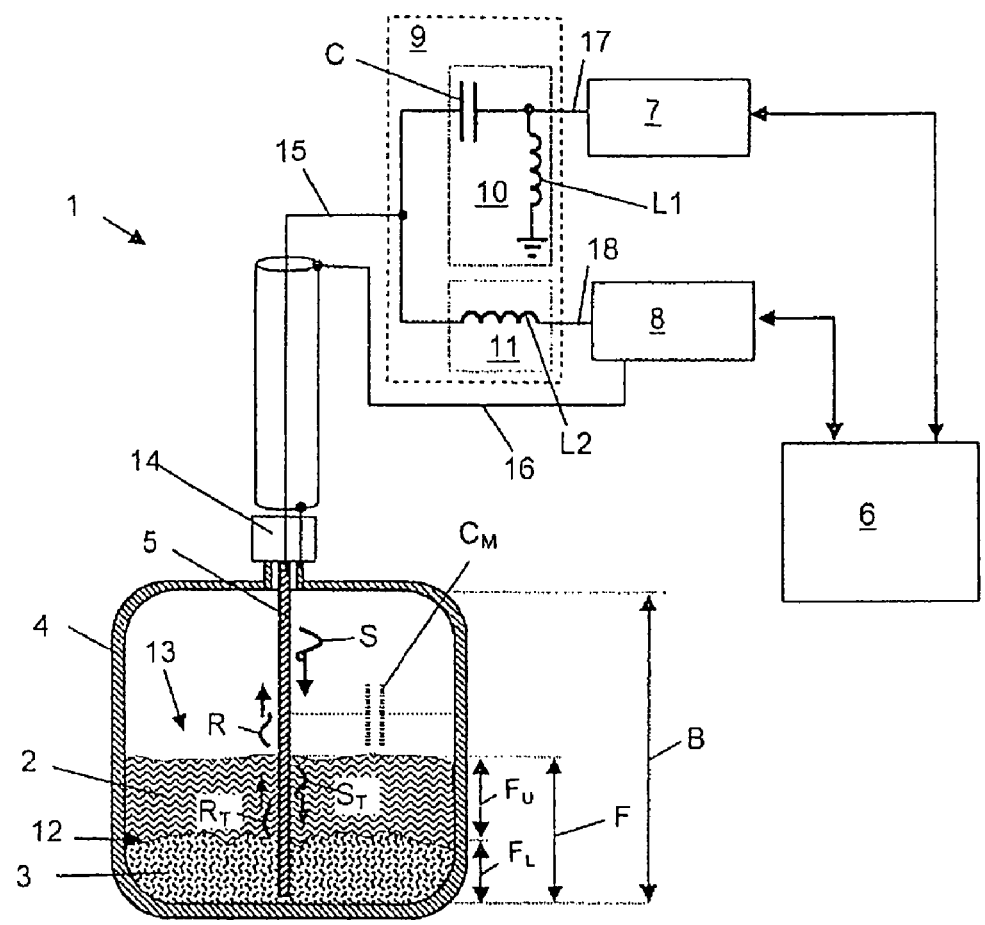
FIG. 3 is a schematic representation of an example of an embodiment of a multisensor unit with a lowpass filter and highpass filter as an apparatus of the invention for measurement signal separation.

As an example, FIG. 3 presents such a diplexer 9 made from a highpass filter 10 and a lowpass filter 11. The highpass filter 10 is constructed from a capacitor C, which is inserted into the first signal path 17, and a first coil $L_1$, which has one end attached to the first signal path after the first capacitor and the other end to ground. The values of the capacitor C and the first coil $L_1$ are matched to each other in such a way that the highpass filter 10 lets the high-frequency measurement signal $M_{HF}$ through virtually unimpeded and highly attenuates the low-frequency measurement signal MLF. The lowpass filter 11 is composed only of the second coil $L_2$, which is integrated into the second signal path 18. The capacitor C and the second coil $L_2$ have the function of decoupling/separating the two measurement signals $M_{HF}$, $M_{LF}$ from each other. In such a case, the capacitor C is low-ohm/transmissive for the high frequency measurement signal $M_{HF}$, and presents for the low-frequency measurement signal $M_{LF}$ a pre-determined, constant capacitance. At the same time, the first coil L1 assures that the second connection of $C_1$ for the capacitive measurement is, via the ground, at a fixed zero potential, and thus that the time-domain reflectometer measurement circuit 7 has no disturbing influence on the measurement of the capacitive measurement circuit 8. The second coil L2 is low-ohm/transmissive for the low-frequency measurement signal $M_{LF}$ of the capacitive measurement circuit 8 and high-ohm/non-transmissive for the high-frequency measurement signal.

The invention claimed is:

1. An apparatus for ascertaining and/or monitoring at least one fill-level of at least one medium in a container according to a travel-time measuring method and/or a capacitive measuring method, which comprises:

at least one measuring probe;

a capacitive measurement circuit, which produces a low-frequency measurement signal on the measuring probe and through this performs an ascertainment of the capacitance or a reactance;

a time-domain reflectometer measuring circuit, which produces a high-frequency, electromagnetic signal sent out as a sent signal, which receives a reflection signal as an echo, and through a time difference between the sending of the sent signal and the receipt of the reflection signal a travel-time or a travel-time dependant echo curve is ascertained;

a control/evaluation unit, which controls both of said measurement circuits and which from the ascertained capacitance, the ascertained travel-time and/or the ascertained travel-time-dependant echo curve ascertains fill-level; and a diplexer, which sends the low-frequency measurement signal and the high-frequency, electromagnetic measurement signal to the measuring probe and effects a signal separation of the high-frequency, electromagnetic measurement signal into the first signal path of said time-domain reflectometer measurement circuit and the low-frequency measurement signal into said second signal path of said capacitive measurement circuit.

2. The apparatus as claimed in claim 1, wherein:
said diplexer includes at least one highpass filter matched to the high-frequency, electromagnetic measurement signal and at least one lowpass filter matched to the low-frequency measurement signal.

3. The apparatus as claimed in claim 1, wherein:
said highpass filter is composed of at least a first capacitor and a first coil.

4. The apparatus as claimed in claim 1, wherein:
said lowpass filter is composed of at least a second coil.

5. The apparatus as claimed in claim 1, wherein:
measuring occurs alternately according to a travel-time method and/or a capacitive method and said capacitive measurement circuit and said time-domain reflectometer measurement circuit are alternately operated and evaluated by said control/evaluation unit.

6. The apparatus as claimed in claim 1, wherein:
measuring occurs simultaneously according to a travel-time method and/or a capacitive method and said capacitive measurement circuit and said time-domain reflectometer measurement circuit are simultaneously operated and evaluated by said control/evaluation unit.

* * * * *